(12) United States Patent
Geyrhofer et al.

(10) Patent No.: US 7,503,618 B2
(45) Date of Patent: Mar. 17, 2009

(54) SLIDABLE DOOR

(75) Inventors: Mattias Geyrhofer, Göteborg (SE); Patrick Verhée, Göteborg (SE); Alex Daniel, Göteborg (SE)

(73) Assignee: GM Global Technology Operations Inc., Detroit, MI (US)

( * ) Notice: Subject to any disclaimer, the term of this patent is extended or adjusted under 35 U.S.C. 154(b) by 0 days.

(21) Appl. No.: 11/486,063

(22) Filed: Jul. 14, 2006

(65) Prior Publication Data
US 2007/0120395 A1 May 31, 2007

(30) Foreign Application Priority Data
Jul. 18, 2005 (EP) ................... 05106564

(51) Int. Cl.
*B60J 5/06* (2006.01)
*B60J 5/04* (2006.01)

(52) U.S. Cl. ............... 296/146.11; 49/226; 49/227; 49/232; 49/334; 49/335

(58) Field of Classification Search ............ 296/146.11, 296/155, 202, 210, 216.01, 216.02, 216.04, 296/146.12; 49/36, 226, 227, 232, 334, 335, 49/41
See application file for complete search history.

(56) References Cited

U.S. PATENT DOCUMENTS

| | | | |
|---|---|---|---|
| 2,947,567 A * | 8/1960 | Barenyi ................. 296/193.12 |
| 2,956,836 A * | 10/1960 | James et al. .................... 49/36 |
| 3,693,997 A * | 9/1972 | Dreyer ........................ 280/775 |
| 4,017,117 A * | 4/1977 | Eggert, Jr. ................. 296/146.9 |
| 5,992,918 A * | 11/1999 | Gobart et al. .......... 296/146.13 |
| 6,676,193 B1 | 1/2004 | Hanagan |
| 6,761,393 B2 * | 7/2004 | Durand et al. ........... 296/146.8 |

FOREIGN PATENT DOCUMENTS

FR 2699126 12/1992
WO 95/24322 9/1995

OTHER PUBLICATIONS

European Search Report.

* cited by examiner

*Primary Examiner*—H Gutman
*Assistant Examiner*—Melissa A Black
(74) *Attorney, Agent, or Firm*—Harness, Dickey & Pierce PLC

(57) ABSTRACT

A wheeled automotive vehicle including a body structure, including a driver compartment and including an opening into the compartment. A door is cooperatively dimensioned and configured to close the opening, the opening being formed by portions of the body structure at the front and rear side of the opening. A hinge is pivotably holding the door, in a first position, at one of the front and rear side of the opening. A guide system is provided along a lower portion of the door on the same side of the opening as the hinge. During opening, the door is maneuverable upwardly along the guide system until it reaches the first position. From the first position, the door is pivotally movable around an axis, propagating in the transverse direction of the vehicle, and in a direction away from the opening.

15 Claims, 5 Drawing Sheets

SLIDABLE DOOR

PRIORITY STATEMENT

The present application hereby claims priority under 35 U.S.C. §119 on European patent application number EPC 05106564.7 filed Jul. 18, 2005, the entire contents of which is hereby incorporated herein by reference.

FIELD

The present invention generally relates to a wheeled automotive vehicle. For example, it may relate to one including a body structure, including a driver compartment and including an opening into the compartment, and a door cooperatively dimensioned and configured to close the opening, the opening being formed by portions of the body structure at the front and rear side of the opening, with a hinge pivotably holding the door, in a first position, at one of said front and rear side of the opening. Furthermore, the invention generally relates to a method of operating such a door of a wheeled automotive vehicle.

TECHNICAL BACKGROUND

Crowded urban environment provides a need for more efficient use of parking spaces. Non-conventional door closures for wheeled automotive vehicles have been experimented with for many years, showing up in speciality cars and prototypes.

With conventional doors that swing out from the vehicle around a substantially vertical axis, the length of the door must be reduced or even minimized to reduce its outward trajectory when opened. In addition to making egress and access to the front seat a bit more complicated since the opening into the wheeled automotive vehicle is reduced these types of doors also requires that one enter from one direction, normally from the rear of the vehicle. Everyone, who's had an automotive vehicle are familiar with the issue of swinging in and out doors in order to pass an open door and enter from the intended direction (i.e. from the rear).

A further issue with doors of conventional type is the potential hazard when the door is dangerously swinged out into, motor, bicycle or pedestrian traffic during a stop by a side of the road or street.

U.S. Pat. No. 6,676,193 B1 of Hanagan shows a compact vehicle with an upwardly opening side door. However, it is realized that the degree of opening during normal operation is low, making it difficult for people to access and egress. It is anticipated that there is a need for improvement of automobile doors for wheeled vehicles, such as for sedans, vans, trucks and other automobiles, and the issues of easy access as well as safe and comfortable opening needs to be further addressed.

SUMMARY

In at least one embodiment, to provide for a comfortable access and egress of a vehicle, a more direct possibility to enter or leave is provided, regardless of where you come from or where you're heading when leaving the car.

In at least one embodiment, a vehicle is provided that requires a reduced or even minimal amount of space beside the entry door for driver access or egress.

In at least one embodiment, a door is provided that is easy to handle and suitable for use of e.g. handicapped people.

According to at least one embodiment of the invention, there is provided a wheeled automotive vehicle including a body structure, including a driver compartment and including an opening into the compartment, and a door cooperatively dimensioned and configured to close the opening, the opening being formed by portions of the body structure at the front and rear side of said opening. Further, a hinge is provided for pivotably holding the door, in a first position, at one of the front and rear side of the opening. A guide system is provided along a lower portion of the door in its closed condition and on the same side of the opening as the hinge. The door, during opening, is maneuverable upwardly along the guide system until it reaches the first position, from which first position; the door is pivotally movable around an axis, propagating in the transverse direction of the vehicle, and in a direction away from the opening.

In at least one embodiment, the guide system is provided at the lower A-pillar of the vehicle.

In at least one embodiment, the hinge in the first position may be formed by a pivoting device positioned by a lower front portion of the door.

The door desirably includes at least one biasing device operatively connected to the guide system. Furthermore, the door includes a set of biasing devices operatively connected to the hinge.

The vehicle may include, for example, a first set of biasing devices connected between the frame and the door. Usually, the first set of biasing devices includes a gas spring. Desirably, torsion springs may be included about the pivoting axis biasing the door into an open position. Alternatively, the opening and closing movement of the door may be achieved powered by a motor or manually.

According to a second aspect of at least one embodiment of the invention, a roof portion is arranged fixed to the door thereby enabling the roof portion to follow the motion of the door during opening and closing movement. For example, the roof portion may be arranged fixed to one of the doors on respective left and right side of the vehicle.

In at least one embodiment, the guide system may include a guide and a pair of guide rollers adapted to follow the guide. The use of two guide rollers provided near one another provides for an improved guiding of the movement, especially in the initial stage of movement. Upon initial movement of the door, the upper rear edge portion of the door preferably moves outwardly from the frame.

Advantageously, the opposite door opening side, through its entire propagation along the opening, has a wider inclination in relation to a horizontal plane than the guide of the guide system provided at one opening side. The shape of the guide rail generally follows that of the opening side where it is positioned.

In order to more clearly describe embodiments of the invention, an example method is included for an opening of a wheeled automotive vehicle including a body structure, including a driver compartment and including an opening into the compartment, a door cooperatively dimensioned and configured to close the opening, the opening being formed by portions of the body structure at the front and rear side of said opening, and a hinge pivotably holding the door, in a first position, at one of the front and rear side of the opening. The door, during opening, is maneuvered upwardly along a guide system being provided along a lower portion of the door as seen in its closed condition and on the same side of the opening as the hinge. When the door reaches the first position, the door is pivoted around an axis, the axis propagating in the transverse direction of the vehicle, and the door is pivoted in a direction away from the opening.

BRIEF DESCRIPTION OF THE DRAWINGS

An example embodiment of the present invention will now be described in more detail, with reference to the accompanying drawings.

FIG. 3a discloses a closed condition, FIG. 3b discloses an intermediate first position (A) and FIG. 3c discloses an opened condition of a wheeled automotive vehicle according to a first embodiment of the invention.

FIG. 4a discloses a closed condition, FIG. 4b discloses an intermediate first position (A) and FIG. 4c discloses an opened condition of a wheeled automotive vehicle according to a second embodiment of the invention.

DETAILED DESCRIPTION OF EXAMPLE EMBODIMENTS

A first embodiment of the invention related to a wheeled automotive vehicle will be described in more detail in the following with reference to the accompanying drawings.

Figure 1:
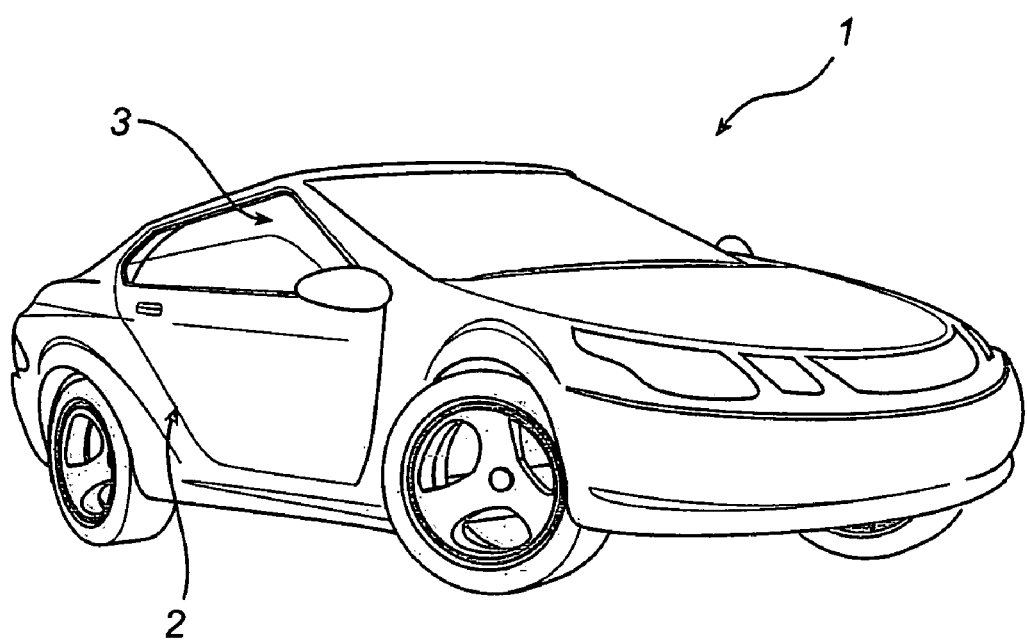
FIG. 1 is a perspective view of an example of a wheeled automotive vehicle appropriate for providing an opening according to the method of an example embodiment of the present invention.

Referring now to FIG. 1, where a car 1 is disclosed with a body structure 2. The body structure 2 provides a driver compartment 3. An opening 4 into the compartment 3 is covered by a door 9 cooperatively dimensioned and configured to close the opening 4.

Figure 3A:
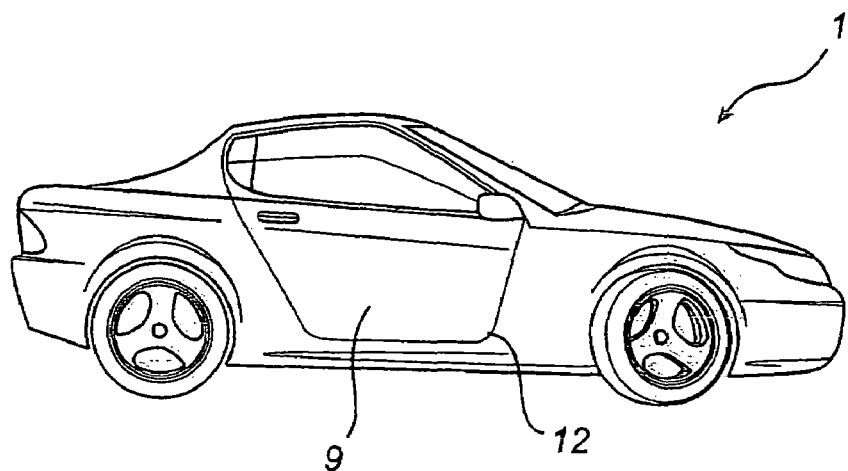
FIGS. 3a-3c discloses an opening sequence, as seen from the side, of a vehicle according to a first embodiment of the invention.
Figure 3B:
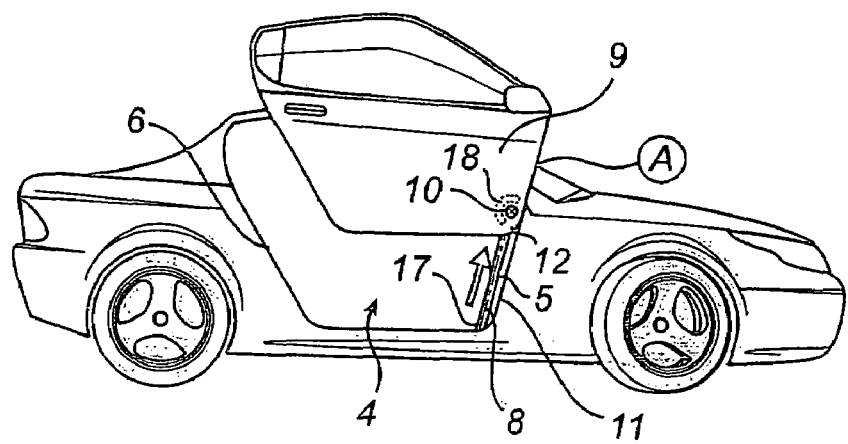
Figure 3C:
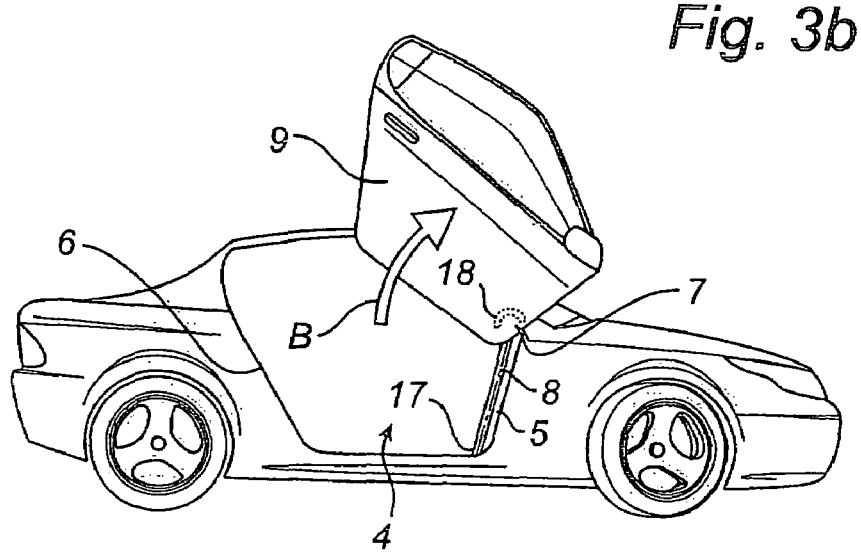

With reference to FIGS. 3a-3c an opening sequence of a vehicle according to a first embodiment of the invention is disclosed. FIG. 3a discloses a closed condition of the door 9 from which closed condition the door is actuatable for opening movement. For example, the door may be actuated by a remote key or key FOB and the opening movement is performed automatically. However, it is also possible to open the door manually by simply grabbing a handle.

In FIG. 3b the door is in an intermediate first position (A). As can be seen the opening 4 is formed by portions of the body structure at the front 5 and rear 6 sides of the opening 4. A guide system 8 is provided along a lower A-pillar 11. When the door reaches the first position (A) a hinge 7 is pivotably holding the door, at the front side of the opening 5, the door 9 is pivotally movable around an axis 10, propagating in the transverse direction of said vehicle 1.

The door is pivoted in a direction away from the opening. By a pivoting angle of 90 degrees an almost total opening degree is accomplished, although a pivoting angle from 30 degrees or more will be sufficient to provide for an accurate opening degree in combination with the initial sliding movement. A door in its open condition is disclosed in FIG. 3c.

Figure 2A:
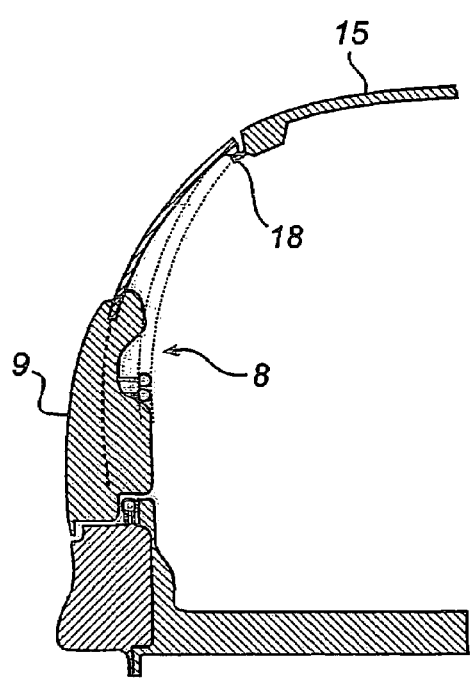
FIG. 2a discloses a cross sectional elevation of a guide system according to first embodiment of the wheeled automotive vehicle when the door is in a closed condition.
Figure 2B:
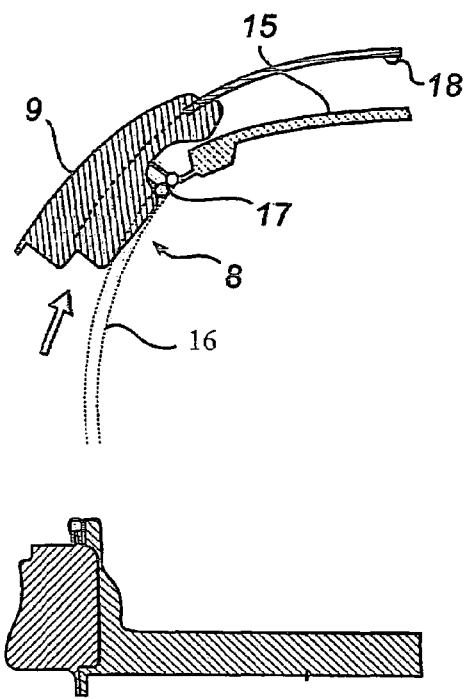
FIG. 2b discloses a cross sectional elevation of a guide system according to first embodiment of the wheeled automotive vehicle when the door is in the first position (A).

The hinge 7 is formed by a pivoting device positioned by a lower front portion 12 of the door 9. Referring now to FIGS. 2a-2b the initial sliding movement of the door 9 along the guide system 8 is disclosed. At the top of the door 9 a seal 18 is provided resting on the roof structure 15 of the vehicle.

The guide system 8 includes a guide 16 and a pair of guide rollers 17 adapted to follow said guide 16 in the desired path to the first position (A) as disclosed in FIG. 2b. Having reached the first position (A) a pivoting movement of the door is following. During closing, the procedure is reverse to the above described.

Figure 5A:
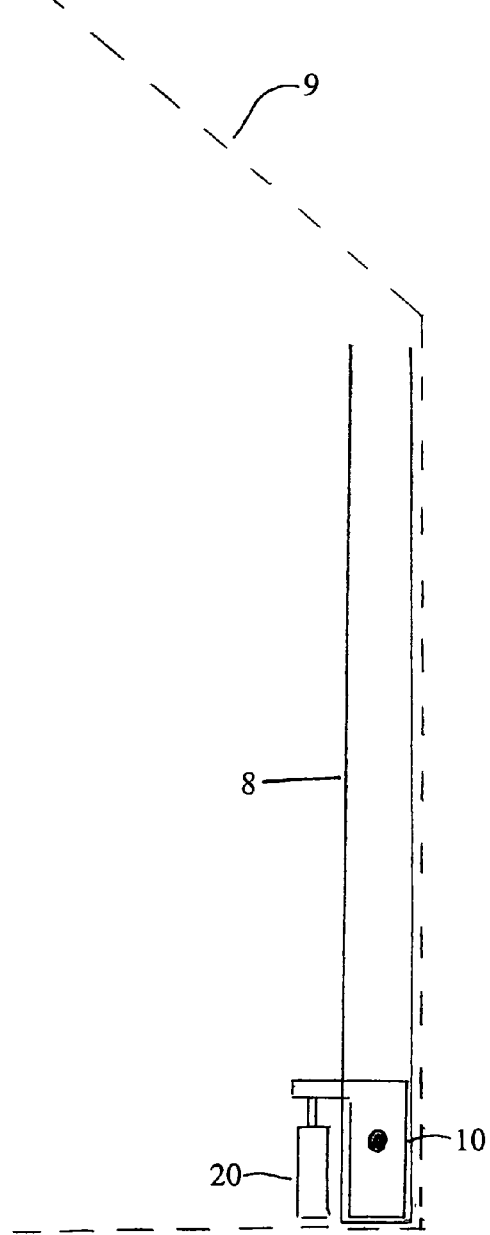
FIGS. 5a-5b schematically illustrate an exemplary biasing device according to an embodiment of the invention, with the vehicle door in a closed position (5a) and the vehicle door in the first position (5b).
Figure 5B:
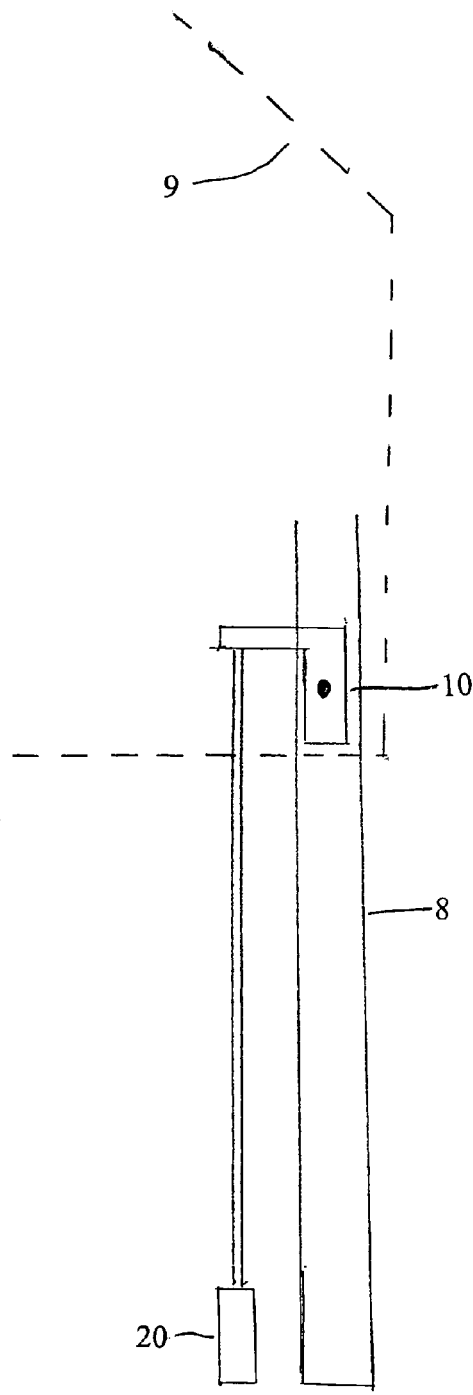

Furthermore, the door 9 may include at least one biasing device 20, operative connected to the guide system 8. A second set of biasing devices may be operatively connected to the hinge 7 (FIGS. 5a, 5b). The vehicle may include, for example, a first set of biasing devices connected between the frame and the door. Usually, the first set of biasing devices includes a gas spring. Esirably, torsion springs may be included about the pivoting axis biasing the door into an open position. Alternatively, the opening and closing movement of the door may be achieved powered by a motor or manually.

Figure 4A:
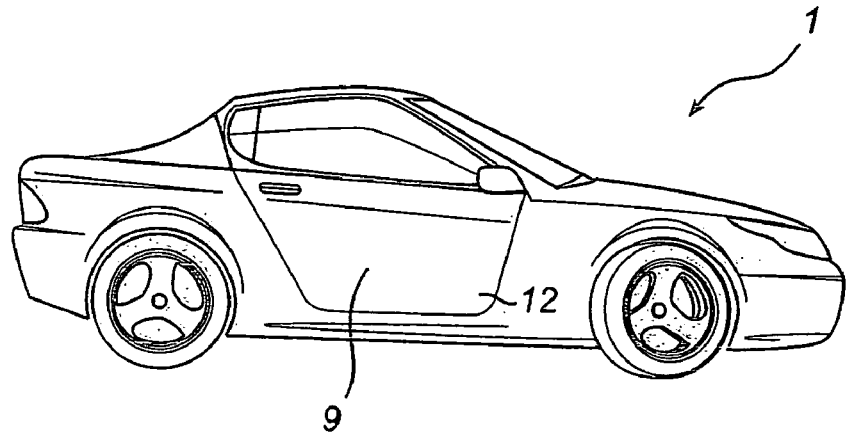
FIGS. 4a-4c discloses an opening sequence, as seen from the side, of a vehicle according to a second embodiment of the invention.
Figure 4B:
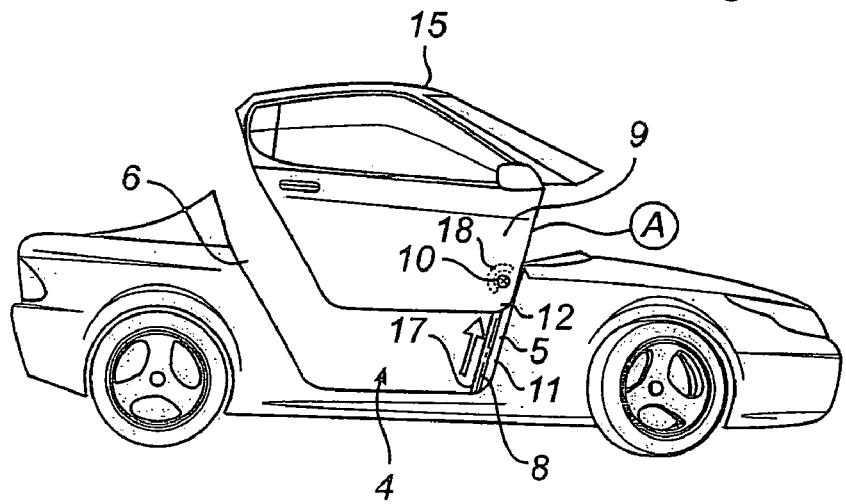
Figure 4C:
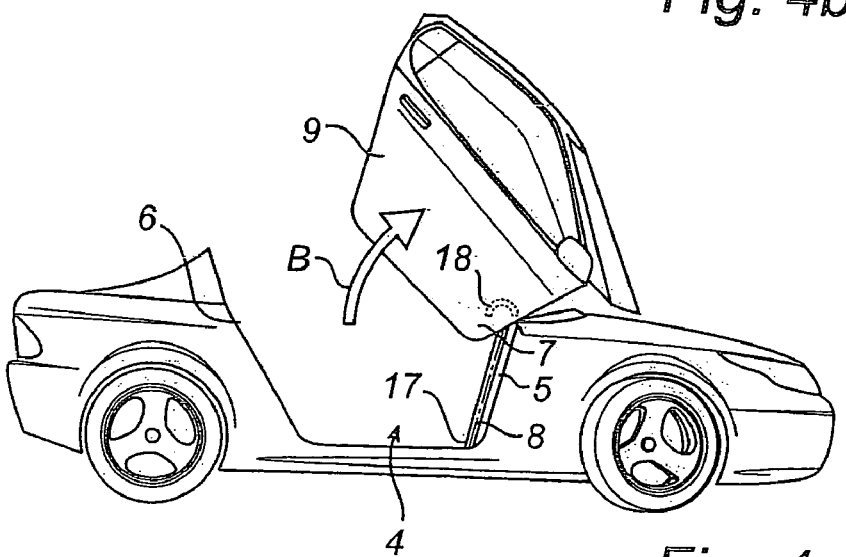

With reference to FIGS. 4a-4c an opening sequence of a vehicle according to a second embodiment of the invention is disclosed. FIG. 3a discloses a closed condition of the door 9 from which closed condition the door is actuatable for opening movement. A roof portion 15 is arranged fixed to the door thereby enabling the roof portion to follow the motion of the door during opening and closing movement. Furthermore, the roof portion is arranged fixed to one of the doors on respective left and right side of the vehicle thus forming a semisymmetric system taken from the longitudinal mid of the vehicle.

In at least one embodiment, the door is actuated by a remote key or key FOB and the opening movement is performed automatically. However, it is also possible to open the door manually by simply grabbing a handle.

In FIG. 4b the door is in an intermediate first position (A). As can be seen the opening 4 is formed by portions of the body structure at the front 5 and rear 6 sides of said opening 4. A guide system 8 is provided along a lower A-pillar 11.

When the door reaches the first position (A) a hinge 7 is pivotably holding the door, at the front side of the opening 5, the door 9 and the roof portion 15 is pivotally movable around an axis 10, propagating in the transverse direction of the vehicle 1. The door is pivoted in a direction away from the opening. By a pivoting angle of 90 degrees an almost total opening degree is accomplished, although a pivoting angle from 30 degrees or more will be sufficient to provide for an accurate opening degree in combination with the initial sliding movement. A door 9 and its roof portion 15 in an open condition are disclosed in FIG. 4c.

The hinge 7 is formed by a pivoting device positioned by a lower front portion 12 of each door 9. Different from FIGS. 2a-2b the guide system 8 is arranged vertical in order not to squeeze the roof portion 15.

The top of the door 9 is provided fixed to the roof structure 15 of the vehicle. The guide system 8 includes a guide 16 and a pair of guide rollers 17 adapted to follow the guide 16 in the desired path to the first position (A) as disclosed in FIG. 2b. Having reached the first position (A) a pivoting movement of the door and the associated roof portion is following. During closing, the procedure is reverse to the above described.

Although the present invention has been described in connection with particular embodiments thereof, it is to be understood that various modifications, alterations and adaptations may be made by those skilled in the art without departing from the claimed scope.

In order to secure a smooth opening the opposite door opening side, through its entire propagation along the opening, has a wider inclination in relation to a horizontal plane than that of the guide of the guide system 8. Thus, the guide 16 of the guide system has a curvature describing the desired path of movement in the plane of the opening that correlates to the shape of the other side of the door opening.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wheeled automotive vehicle comprising:
    a body structure, including a driver compartment and including an opening into the compartment;
    a door cooperatively dimensioned and configured to close the opening, the opening being formed by portions of the body structure at a front and a rear side of the opening;
    a hinge pivotably holding said door in a first position, at one of the front and rear side of the opening; and
    a guide system, provided along a lower portion of the door in its closed condition and on the same side of the opening as the hinge, and arranged to allow the entire door to slide upwardly along said guide system from a closed position to the first position, and wherein
    said hinge is arranged to allow the door to pivot, from the first position in a direction away from the opening around an axis extending in a transverse direction of a longitudinal direction of said vehicle.

2. The vehicle according to claim 1, wherein the guide system is provided at a lower A-pillar of said vehicle.

3. The vehicle according to claim 1, wherein said hinge, in the first position, being formed by a pivoting device positioned by a lower front portion of said door.

4. The vehicle according to claim 1, wherein said door includes at least one biasing device, operatively connected to said guide system.

5. The vehicle according to claim 1, wherein said door includes a set of biasing devices operatively connected to said hinge.

6. The vehicle according to claim 1, wherein a roof portion is arranged fixed to said door thereby enabling said roof portion to follow the motion of said door during opening and closing movement.

7. The vehicle according to claim 6, wherein said roof portion is arranged fixed to one of said doors on respective left and right side of said vehicle.

8. The vehicle according to claim 1, wherein said guide system includes a guide and a pair of guide rollers adapted to follow said guide.

9. The vehicle according to claim 1, wherein the door is configured to be rotatable around the axis to pivot in a direction toward a front of the automotive vehicle.

10. A method for opening a door of a wheeled automotive vehicle including
    a body structure, including a driver compartment and including an opening into the compartment, a door cooperatively dimensioned and configured to close the opening, the opening being formed by portions of the body structure at a front and a rear side of the opening, and
    a hinge pivotably holding the door, in a first position, at one of the front and rear side of the opening, the method comprising:
    sliding the entire door upwardly along a guide system provided along a lower portion of the door as seen in its closed condition on the same side of the opening as the hinge from a closed position to a first position; and
    from the first position pivoting the entire door in a direction away from the opening, around an axis extending in a transverse direction of a longitudinal direction of the vehicle.

11. The vehicle according to claim 2, wherein said hinge, in the first position, being formed by a pivoting device positioned by a lower front portion of said door.

12. The vehicle according to claim 2, wherein said door includes at least one biasing device, operatively connected to said guide system.

13. The vehicle according to claim 2, wherein said door includes a set of biasing devices operatively connected to said hinge.

14. The vehicle according to claim 2, wherein said guide system includes a guide and a pair of guide rollers adapted to follow said guide.

15. The vehicle according to claim 10, wherein pivoting includes rotating the door around the axis in a direction toward a front of the automotive vehicle.

* * * * *